United States Patent
Hodge et al.

(10) Patent No.: US 6,615,549 B1
(45) Date of Patent: Sep. 9, 2003

(54) MOVABLE DOUBLE DECKED STEEL ORCHESTRA STAGE

(76) Inventors: John W. Hodge, Hospital Ground Bldg. G Apt. 20, Charlotte St. Thomas, Amalie, VI (US) 00801; Wilbert Gomez, P.O. Box 9454, St. Thomas, VI (US) 00801

( * ) Notice: Subject to any disclaimer, the term of this patent is extended or adjusted under 35 U.S.C. 154(b) by 0 days.

(21) Appl. No.: 09/497,815

(22) Filed: Feb. 3, 2000

Related U.S. Application Data

(60) Provisional application No. 60/118,969, filed on Feb. 6, 1999.

(51) Int. Cl.[7] .................................................. B60P 3/08
(52) U.S. Cl. .............................. 52/7; 52/143; 135/88.01; 135/912; 280/789; 296/182
(58) Field of Search ...................... 52/7, 143; 135/88.01, 135/912; 280/400, 789; 296/21, 26.15, 163, 181, 182, 183, 204, 178; 410/26; 105/355, 373, 377.02

(56) References Cited

U.S. PATENT DOCUMENTS

| | | | | |
|---|---|---|---|---|
| 1,750,128 A | * | 3/1930 | Romine | |
| 3,709,155 A | * | 1/1973 | Pringle | |
| 3,815,517 A | * | 6/1974 | Przybylinski | |
| 3,895,587 A | * | 7/1975 | Bell | |
| 4,067,469 A | * | 1/1978 | Biaggini et al. | |
| 4,116,135 A | * | 9/1978 | Jackle et al. | |
| 4,374,592 A | * | 2/1983 | Geary et al. | |
| 4,749,317 A | * | 6/1988 | Daniel | |
| 4,881,859 A | * | 11/1989 | Ehrlich | |
| 5,526,940 A | * | 6/1996 | Shea et al. | |

* cited by examiner

Primary Examiner—Robert Canfield
(74) Attorney, Agent, or Firm—Nigel L. Scott

(57) ABSTRACT

Disclosed is a mobile double decked vehicular performance stage which is equipped with a variety of safety devices for use in transporting steel orchestra players and instruments during live performances in parades, carnivals and other events in which the musicians are required to continue to play their instruments while moving along with the crowd. In practice, the stage comprises two identically sized platform surfaces, the lower surface or deck rests on ground engaging wheels and includes steering, brake and tow bar mechanisms to facilitate the movement of the stage. The upper deck is situated above the lower deck in elevated parallel alignment with the lower deck and is secured and maintained in that position by supports which are between the upper and lower decks. Both the upper and lower decks are equipped with safety devices to protect the musicians from injury while the vehicle is in motion, as well as musical stands for holding the musical instruments in place on the vehicle. A canvas or plastic covered canopy roof extends above the upper deck and provides coverage for the musicians and their instruments. The stage is constructed with the safety and security of the users and to provide a means of having a mobile stage which has the facility to move to travel on straight routes and around comers with equal facility.

16 Claims, 8 Drawing Sheets

MOVABLE DOUBLE DECKED STEEL ORCHESTRA STAGE

This application claims the benefit of Provisional application Ser. No. 60/118,969, filed Feb. 6, 1999.

BACKGROUND OF THE INVENTION

The steel drum is a unique musical instrument of recent vintage which is made by converting discarded steel drums into finely tuned musical instruments. When the tuned drum is struck with rubber tipped sticks, it emits a melodious sound which allows persons skilled in the playing of the drum to reproduce the notes of the musical scale and play the full range of music on the instrument. To achieve the best sound effect, the instrument has to be played by a group of musicians comprising a steel band or orchestra which, in some instances, may include over one hundred musicians and an equal or greater number of instruments Initially, steel orchestras were the exclusive and preferred musical accompaniment for participants in carnival costumed street parades in Trinidad and Tobago. To play the instrument, the steel drum instrumentalists had to physically carry their instruments by using various types of belting materials to drape the instrument around the neck, walk in the carnival parade and simultaneously play the individual steel instruments. As a result of a series of factors, including growth in the size of the orchestras, the weight of the instrument, and the fact that one musician was required to strike notes on different drums in quick succession because of the impossibility of playing the full range of music on a single drum. There arose a need for an alternative to the existing method of playing the steel band in parades, i.e. with musical instruments draped around the neck.

In order to continue the tradition of having the steel orchestra perform live in street parades, the instruments were placed on wheeled platforms, the players walked behind their instruments and played while the instruments were being pushed or pulled along the parade route. Although, this method of moving the instruments through the street was an improvement over the then existing means of transporting the instrument, it was still inadequate for the purpose. In fact, the quality of the music suffered, there were numerous problems, not the least of which was the concern regarding the safety of the performers, spectators and the participants in the parade. Moreover, the concern regarding the method of transporting the musicians distracted the observers from the enjoyment of the music and the passing parade.

Currently, the preferred technique for transporting these steel band orchestras is to place the musicians and their instruments on a movable platform, such as a flat-bed truck, trailer or similar transportation means to facilitate the movement of the orchestra through the streets. While a flatbed truck or trailer facilitates the movement of the orchestra through crowded streets and masses of people, the music emanating from the orchestra was not of sustained quality. The safety of the musicians and the participants in the parade was being jeopardized and the problems of managing the movement of the orchestra through crowded narrow streets remained unresolved. This invention resolves the problems associated with the transportation of steel orchestra musicians and their instruments, it can also alleviate problems related to the storage of the instruments and their movement from place to place for staged performances.

Movable stages which can be set up in one location then broken down, transported from one performance location and set up for a performance in another are well known. However, movable vehicular stages on which performers can perform while the stage is in motion are not as commonly known.

This invention relates to a mobile vehicular stage for transportation of musicians, particularly steel band instrumentalists, other artistes and performers in outdoor parades, festivals and carnivals. In such situations, the performers are required to perform while the stage is in motion along the parade route. Under such circumstances, the possibility of injury to the performer caused by sudden stops or other problems on the roadway is greatly enhanced. This invention provides a safe means of transportation for performers who continue to perform while the stage is in motion.

As originally conceived, the mobile vehicular stage of this invention was designed exclusively for transporting a full complement of steel band instrumentalists and their instruments. In practice, the stage is designed in the form of a wheeled platform which can be used for the purpose of transporting any group of musicians or performing artistes who need to perform on a moving vehicle. The stage is towed by a truck or other suitable vehicle and provides a safe means of transporting performing artistes and protecting them from injury while they are performing on the moving platform. In order to accommodate a larger complement of instrument and instrumentalists and to produce a more complete sound from the instruments, applicants have devised the concept of a movable double decked stage.

BRIEF SUMMARY OF THE INVENTION

The double decked Steel Orchestra Stage was developed and designed to overcome the unique problems of transporting steel orchestras in street parades while the musicians are fully engaged in playing their instruments. The stage serves as a protective facility for the performers and a convenient platform for stationary performances and an excellent vantage point which the performers can view their audience and in turn be viewed by the audience.

Accordingly the principal object of this invention is to provide a mobile stage unit which is specifically designed and adapted for the transportation of steel drum musicians, and their instruments in street parades, carnivals and festivals.

Another object of the invention is to provide a mobile stage unit which can accommodate a complete steel drum orchestra of one hundred or more musicians and their instruments in a self-contained unit for purposes of transportation and performance.

Yet another object of the invention is to provide a mobile stage unit which has built in safety devices to protect the musicians, their instruments and the audience from injury or damage while the orchestra is participating in street carnivals or parades. The stage also maximizes the visibility of the performing musicians and enhances the acoustical integrity of the sound emanating from the steel orchestra during mobile or stationery performance.

A further object of the invention is to provide a mobile stage unit that gives the performing players the freedom and comfort of playing their instruments on a mobile stage that is comparable in all respects to a fixed stage or platform.

Still another object of the invention is to provide a mobile stage unit capable of being used as a stationary or mobile performance stage.

One other object of the invention is to provide a mobile stage unit which can be used as a convenient and safe means of transporting and storing the musical instrument between and after performances and as a practice facility for the musicians.

The basic construction material of the mobile stage is steel, particularly steel bars, steel mesh and steel rods that are reinforced, braced and welded together to form the mobile stage unit described in the invention. Steel has been selected as the preferred metal in order to ensure that the decks are capable of supporting the total combined weight of the instrumentalists and their instruments.

In practice, the stage comprises two rectangular platforms arranged as an upper and lower deck. The upper deck rests on several upright posts which support and separate the first floor from the second. On both the first and second decks the surface area of the floor is covered by steel mesh which permits the musicians on each deck to have an unobstructed view of each other and to hear the sound of the instruments on the other. The mesh floor also enables the musical sounds to be heard throughout the upper and lower decks without any muffling of the sound due to a solid barrier. Throughout, each deck there are steel rods, posts and arranging the steel pan instruments in their optimum setting so that the musicians will be able to play their individual instruments.

In order to ensure the safety of the musicians who are expected to perform while the stage is in motion, the upper and lower decks have numerous safety devices. Further the chassis on which the upper and lower deck rests contains a steering and brake mechanisms, shock absorbers and protective wheel covers to make the vehicle safe, durable and capable of withstanding the constant pounding of the steel band beat, as well as the wear and tear caused by the combination of the instruments and the movement of the musicians while engaged in playing the instrument. Both the front and the rear of the stage have specifically designed connecting metal V-shaped steering extension bars, the front bar is designed for attaching the stage to a truck or other propelling vehicle, the rear bar is designed for the attachment of other Steel Orchestra Mobile Stages in a train like assembly.

Safety features incorporated in the design and construction of the Mobile Stage include safety rails, canvass canopy and canopy support poles of aluminum tubing, access steps to the upper level, safety guards at the steps, and recessed wheels with removable steel mesh covering for the wheels (four wheels in the rear and two wheels in the front).

The advantage of this Mobile Stage is that it provides a convenient facility for an entire steel orchestra to perform while in motion and overcomes the problems associated with playing the instrument while it is hung around the neck. Through this invention, it will now be possible for all the instruments (pans) to be mounted on the Mobile Stage so that the players can perform as if they were on a stationary concert stage. The mobile stage makes the steel band orchestra fully adaptable for parades and carnivals.

As a result of this improved mobile stage, it will no longer be necessary to use the current method of transportation which is to place a few instruments on a vehicle trailer. Instead, it will now be possible to fit an entire steel orchestra on the mobile stage for better acoustics and authentic sound production. In addition, the vehicle can be employed in a multipurpose capacity within the scope of its design, utility and usage.

DETAILED DESCRIPTION OF THE INVENTION

Figure 1:
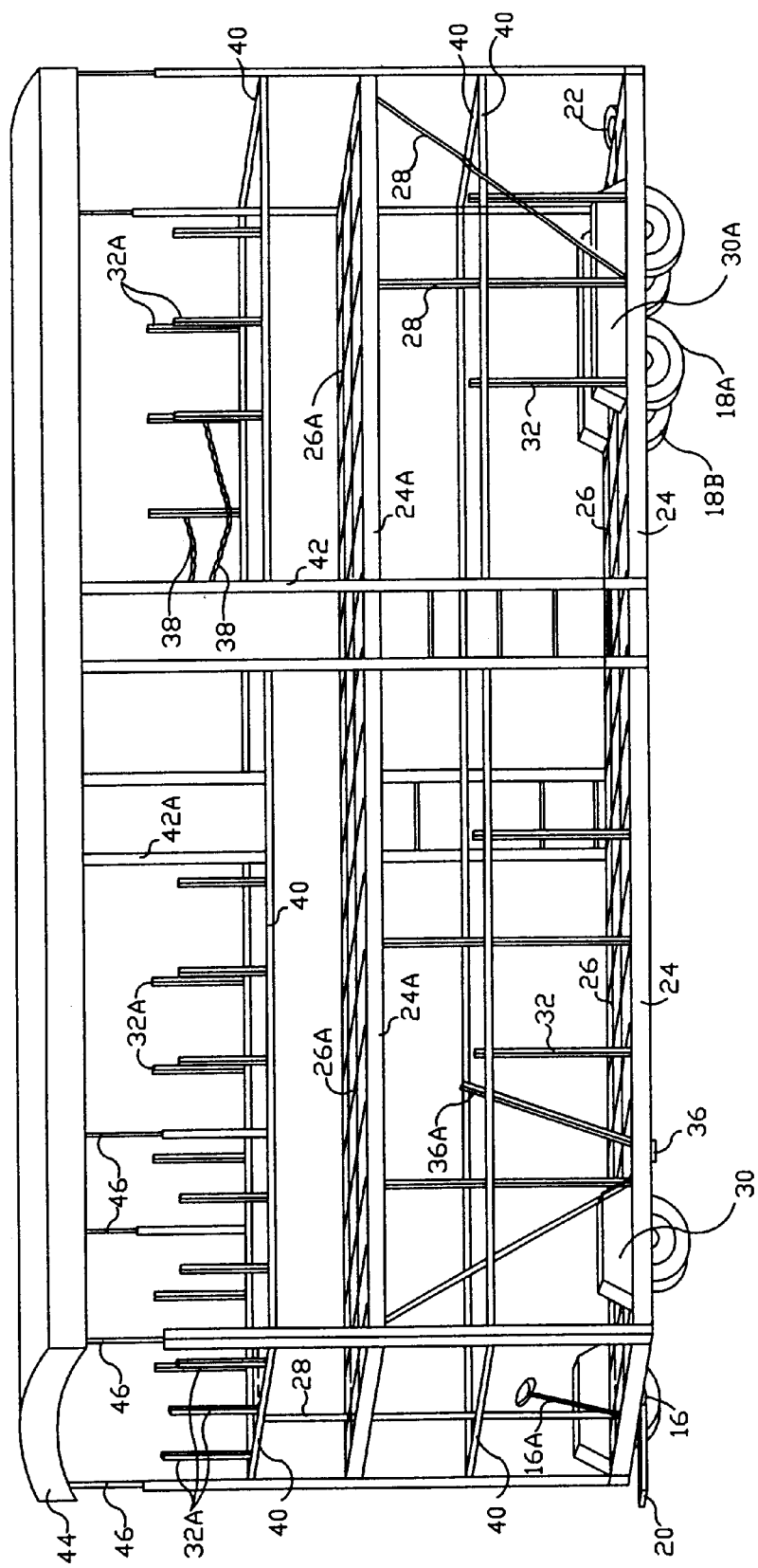
FIG. 1 is a lateral perspective showing the upper and lower decks prior to the placement of musical instruments on the upper and lower levels and other distinctive features of the mobile stage, including the ladders, safety chains, instrument stands, supports for the upper deck and canopy roof, brake handle, wheels and wheel steering mechanism, covers canopy roof and the wheel base for the lower deck are also shown.

In accordance with the invention, the mobile stage 10, is shown as a double decked vehicle having external dimensions of approximately 26 feet long, 10 feet 3 inches wide and 14 to 16 feet tall, the entire vehicle rests on a wheeled base which renders the vehicle mobile and portable. The lower deck of the vehicle comprises the chassis 12, of the vehicle, including the frame 14, steering mechanism 16, front and rear wheels 18, 18A and 18B, and tow bar 20 for attaching the stage to a truck or other towing means. The rear of the frame of the vehicle has coupling means 22, for attaching two or more mobile stage units to each other.

The floor area 24, of the lower deck of the vehicle, that is, the area encompassed by the frame of the vehicle 14, and the corresponding area of the upper deck 24A, are identical in size and are covered with a steel mesh 26, 26A. The mesh 26, and 26A rests on the chassis 12 and frame 14. In general, the mesh material used to cover the surface area of the upper and lower decks is selected based upon the strength of the material and its ability to support the weight of several musicians and their instruments when laid over the metal supports which comprise the frame and chassis of the vehicle. The material selected must be capable of supporting the weight of a full complement of musicians whether the stage is in motion or standing still.

The upper deck 24A sits on upright posts 28, which are attached to the frame 14, of the lower deck and act as supports for the upper deck. In practice, each of the posts is approximately 6 feet 2 inches tall which corresponds to the height of the upper deck above the lower deck.

For the safety of the instrumentalists and participants in the parades, the wheels of the vehicles 18, 18A and 18B are recessed from the outside edge of the frame of the lower deck and are covered by a protective steel mesh covering 30, 30A which is of the same material to the mesh 26, 26A used to cover the floors of the decks 24, 24A. Both the lower and upper decks have built in music stands, 32, 32A on which smaller musical instruments 34, can be hung during the performance of the band and, if necessary, be removed following the performance. The larger instruments occupy free standing locations on the stage, preferably on the lower level.

Generally, the music stands 32, are arranged around the circumference of each deck and are fixed in place so the musicians and their instruments, 34 face outwardly when performing. Any additional floor space is used to accommodate larger instruments which sit on the meshed floor of the decks. In general, the instruments 34, are arranged so as to allow the instrumentalists to move freely about the stage and to optimize the players ability to perform on the instruments 34. Further, because the stage 10, was designed with the idea of providing a safe environment in which the instrumentalists would be able to perform while the vehicle is in motion, the music stands 32, are built of sturdy materials and are fixed in place so that they also serve the dual function of being safety devices which the instrumentalists can hold on to while the vehicle is in motion.

The stage 10, has several built in safety devices including a brake mechanism 36, security chains 38, and hand rails 40, for the musicians to hold on to in the event the vehicle comes to a sudden start or stop. Each side of the vehicle has safety ladders 42 and 42A, on either side of the stage to provide easy access to the upper deck A, from the lower deck/chassis 12. The entire stage unit 10, is covered by a removable canvas canopy 44, which is supported by poles 46, at each corner of the deck and by a center support, 48 which is approximately 6 feet 9 inches along the mid point line of the stage. Access to the upper deck A is gained by a pair of ladders 42 and 42A, located on each side of the stage, these ladders 42 and 42A are equipped with special safety handles and non slip rungs for the benefit of the users. The brake mechanism of the stage 36, includes the brake handle, 36A, has the capability to bring the unit to a complete stop independently of the towing vehicle and to act as a parking brake to permit the stage to be used as a free standing stage unit in non-mobile situations.

In accordance with the drawings, FIG. 1 shows the mobile stage unit 10, including a lower deck 24 and upper deck 24A, both borne on a wheeled chassis 12 which includes the frame 14 and lower deck 24. At the front of the chassis 12 is the steering mechanism 16, steering wheel 16A, and a pair of wheels 18; the rear of the chassis 12 is supported by two pairs of wheels 18A and 18B. The wheels 18, 18A and 18B are supported on wheel axles which are independent of each other. The canopy roof 44 covering the stage is a lightweight waterproof material such as plastic, canvas, tarpaulin or other known semi-permanent or permanent waterproof covering material.

Figure 2:
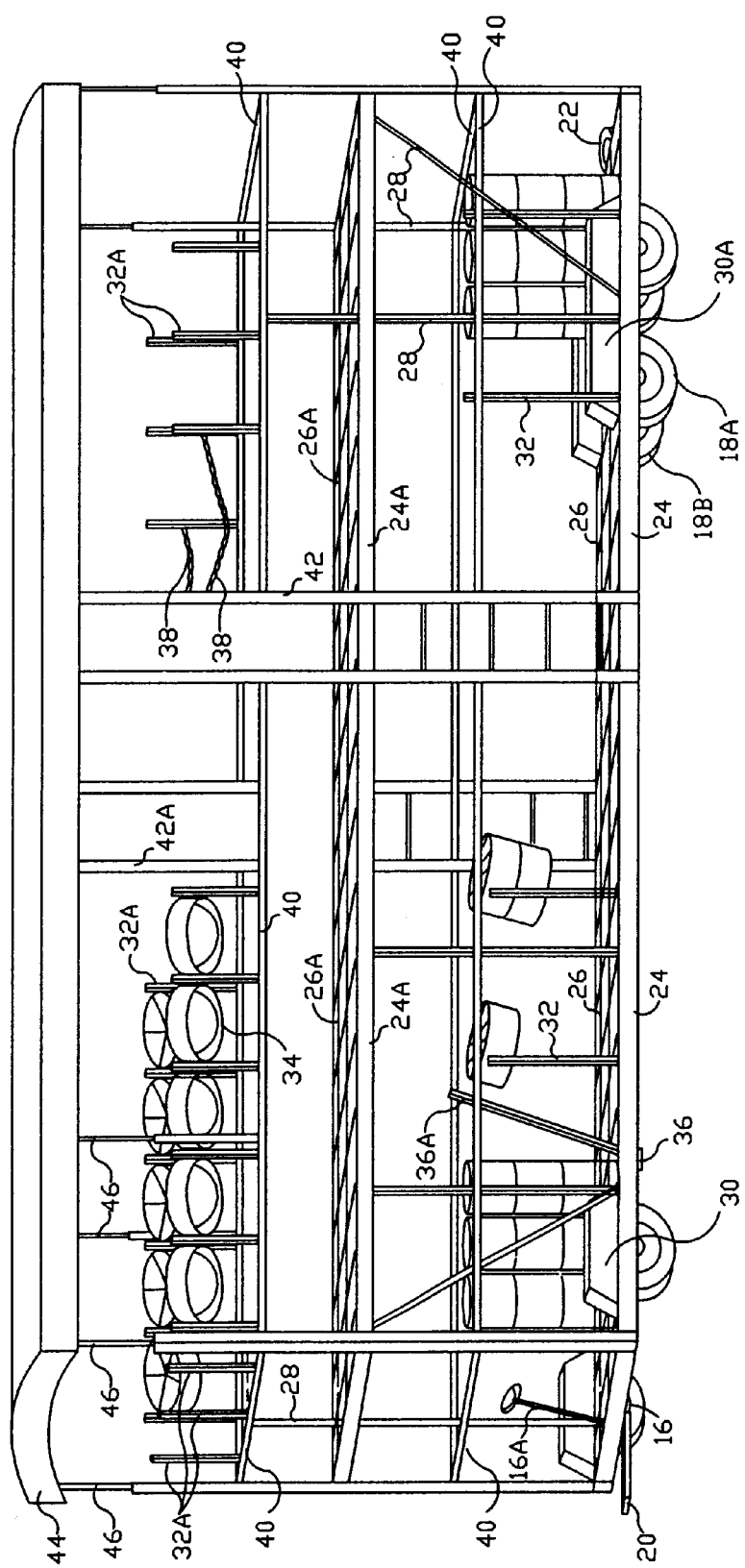
FIG. 2 is a lateral perspective of the stage showing the mobile stage as it would appear when some musical instruments are placed on the upper or lower levels in a simulated playing position.

FIG. 2 is a lateral view of the mobile stage 10, complete with musical instruments 34, and music stands 32, 32A in position on the upper and lower decks, respectively. The relationship of the upper and lower decks to each other and the overall dimensions of the stage are shown. The protective mesh, enclosing the wheel wells 30 and 30A, safety chains 38, ladders with hand rails 42 and 42A, brake 36 and brake handle lever 36A, are shown. The general location and arrangement of the instruments 34, on the stage are illustrated, however, it should be noted that the positions on these drawings are shown for illustrative purposes only.

Figure 3:
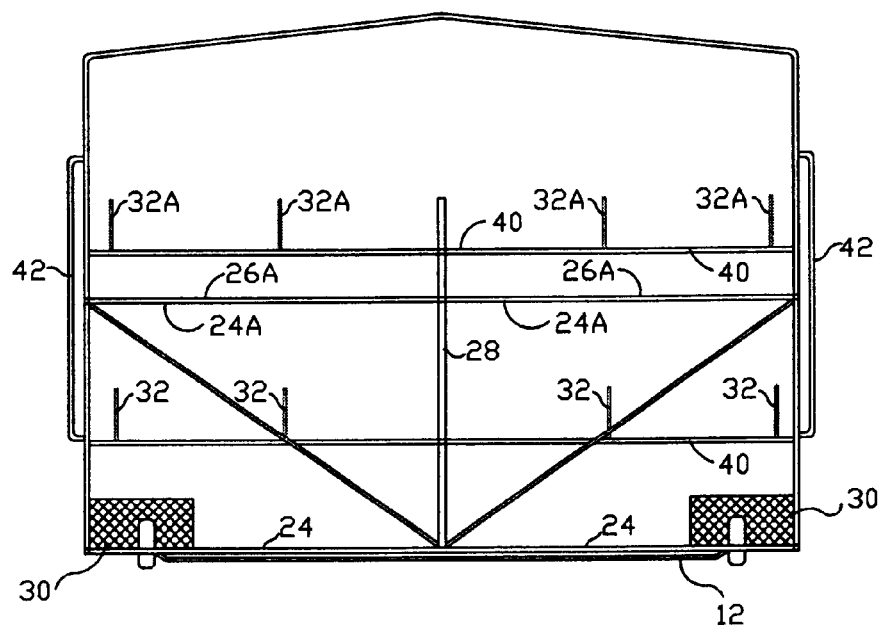
FIG. 3 is a cross-sectional view of the mobile stage from the front showing the upper and lower levels of the stage, side ladders for access to upper level, instrument stands on the upper deck and coverings for the wheel base.
Figure 4:
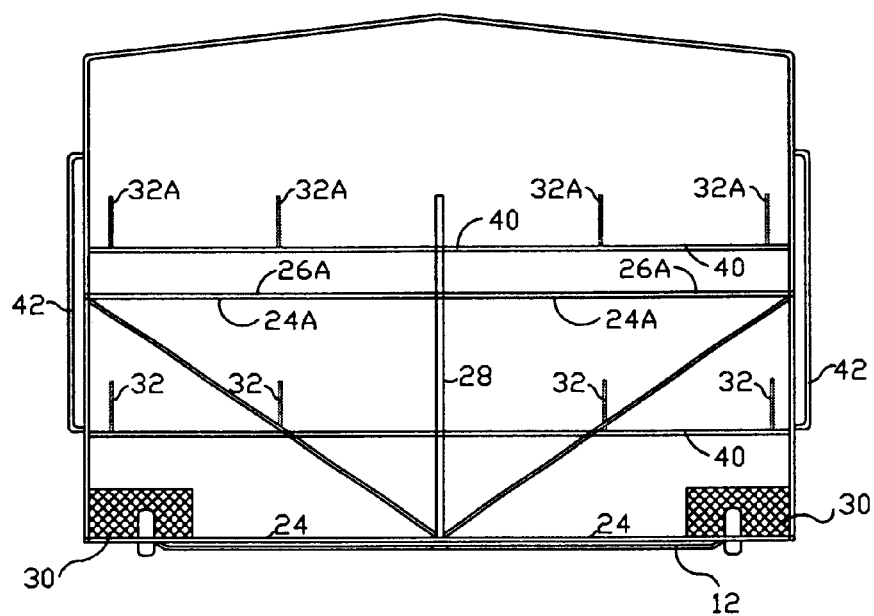
FIG. 4 is a cross-sectional view of the mobile stage from the rear showing the upper and lower levels of the stage, side ladders for access to the upper level, instrument stands on the upper level and coverings for the wheel base.

FIGS. 3 and 4 are views of the mobile stage as it appears when looked at from the front and rear, respectively. They include dimensions for the height, width and length, measurements from the first floor to the second floor, and measurements from the second floor to the top of the mobile stage. It also includes a view of the instrument stands and some of the safety features of the vehicle as seen from the front and rear of the vehicle.

Figure 5:
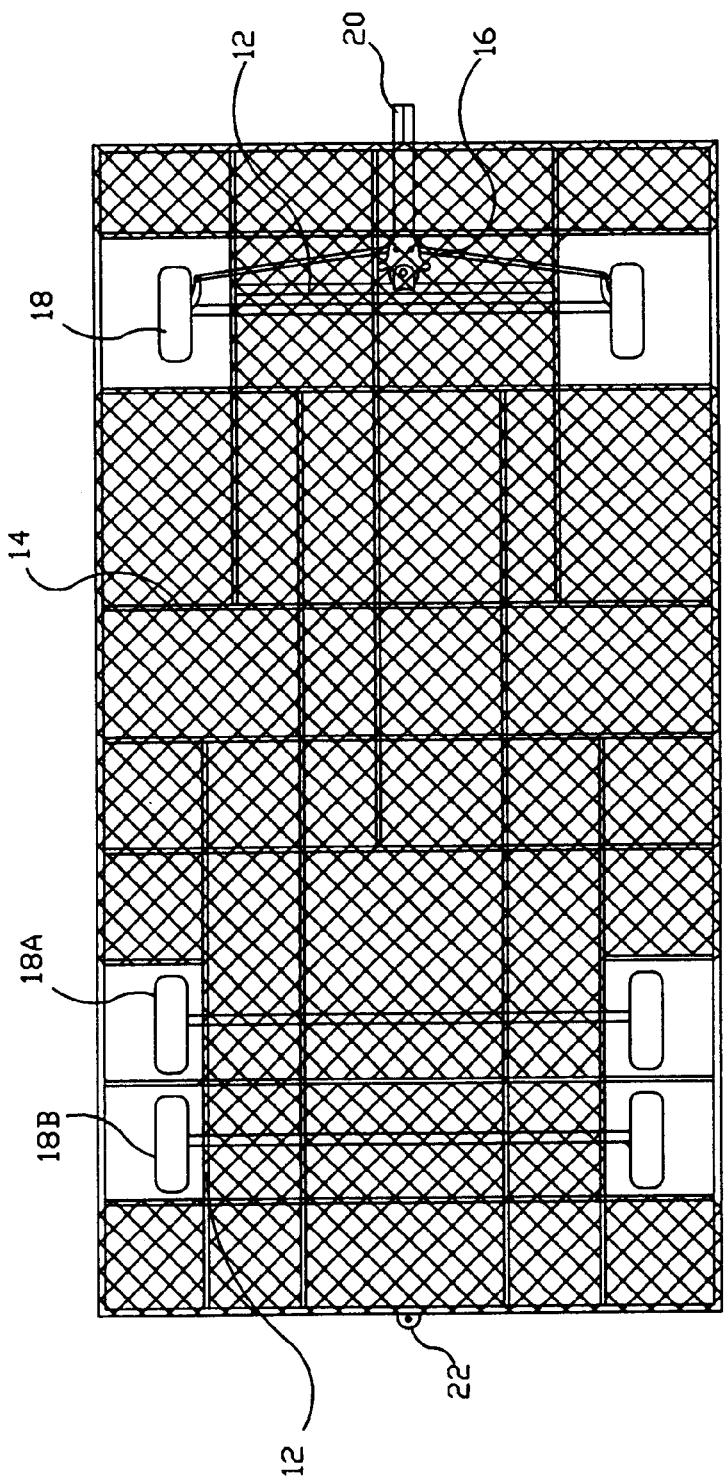
FIG. 5 is a view of the lower chassis of the mobile stage showing the frame of the lower deck and chassis including the steering mechanism and tow bar, front and rear wheels, rear hitch and meshed floor covering.

FIG. 5 shows the complete lower deck and chassis 12, including the mesh flooring 24 and the frame on which the mesh flooring rests 14, the safety enclosures of the wheels 30 and 30A are not shown. The steering mechanism 16 and tow bar 20, at the front of the stage are visible through the mesh floor, the hitch 22, at the rear of the stage is also shown.

Figure 5A:
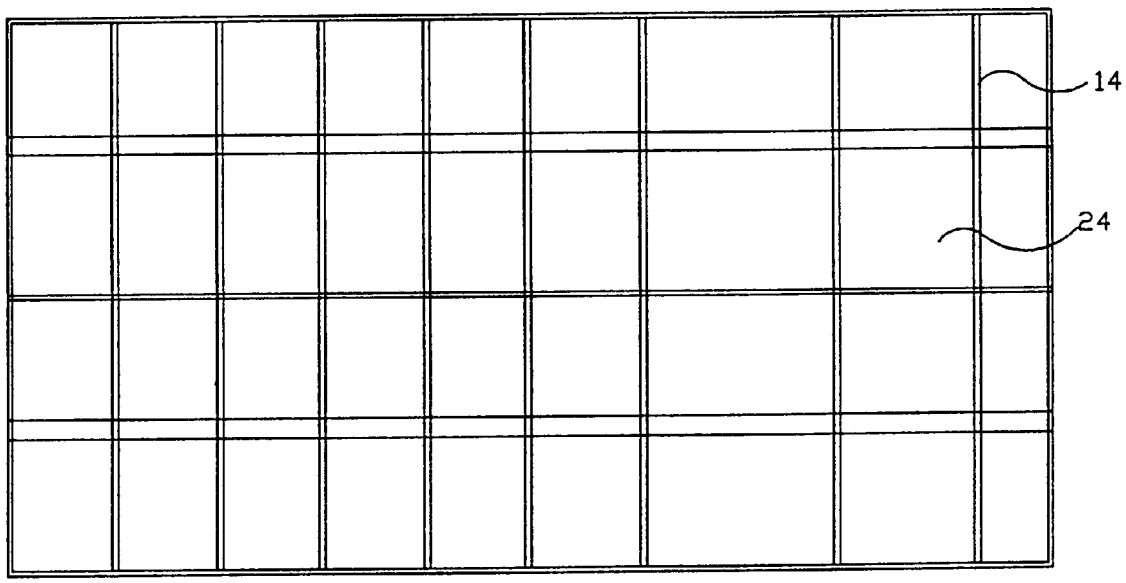
FIG. 5A is a view of the lower chassis of the mobile stage with the mesh flooring in place, the wheels are shown as exposed i.e. without the protective wheel coverings.

FIGS. 5A and 5B represent the top-down view of the upper floor. 5A shows the frame, 14 on which the mesh flooring 26A rests for support and 5B shows the floor 24A, with the mesh resting in place on the frame.

Figure 6:
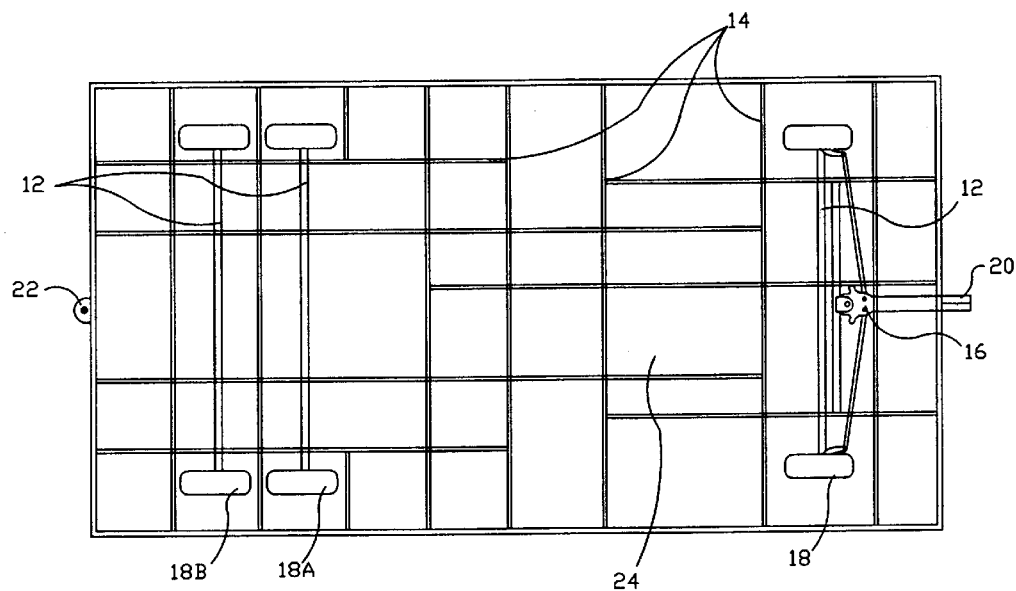
FIG. 6 is an enlarged view of the front steering assembly showing its attachment to the front wheels of the mobile rack.

FIG. 6 shows the lower frame of the vehicle resting on the front wheels 18, and rear wheels 18A, and 18B, without the mesh flooring coverage.

Figure 6A:
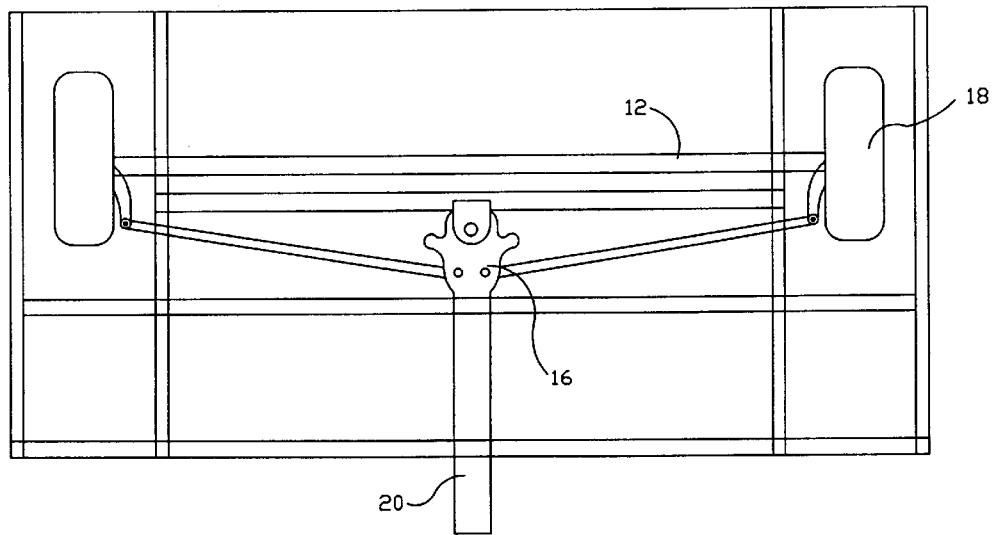

FIG. 6A is an enlarged view of the front steering mechanism 20, showing its connection to the front wheels 18 and tow bar 20A. The hitch 22 for connecting the rear one mobile stage, to the front another is shown at the rear of the drawing.

FIG. 4 shows the complete lower deck and chassis 12, including the mesh flooring 24 with the safety enclosures of the wheels removed. The steering mechanism and tow bar of the stage are visible through the mesh floor.

Figure 7:
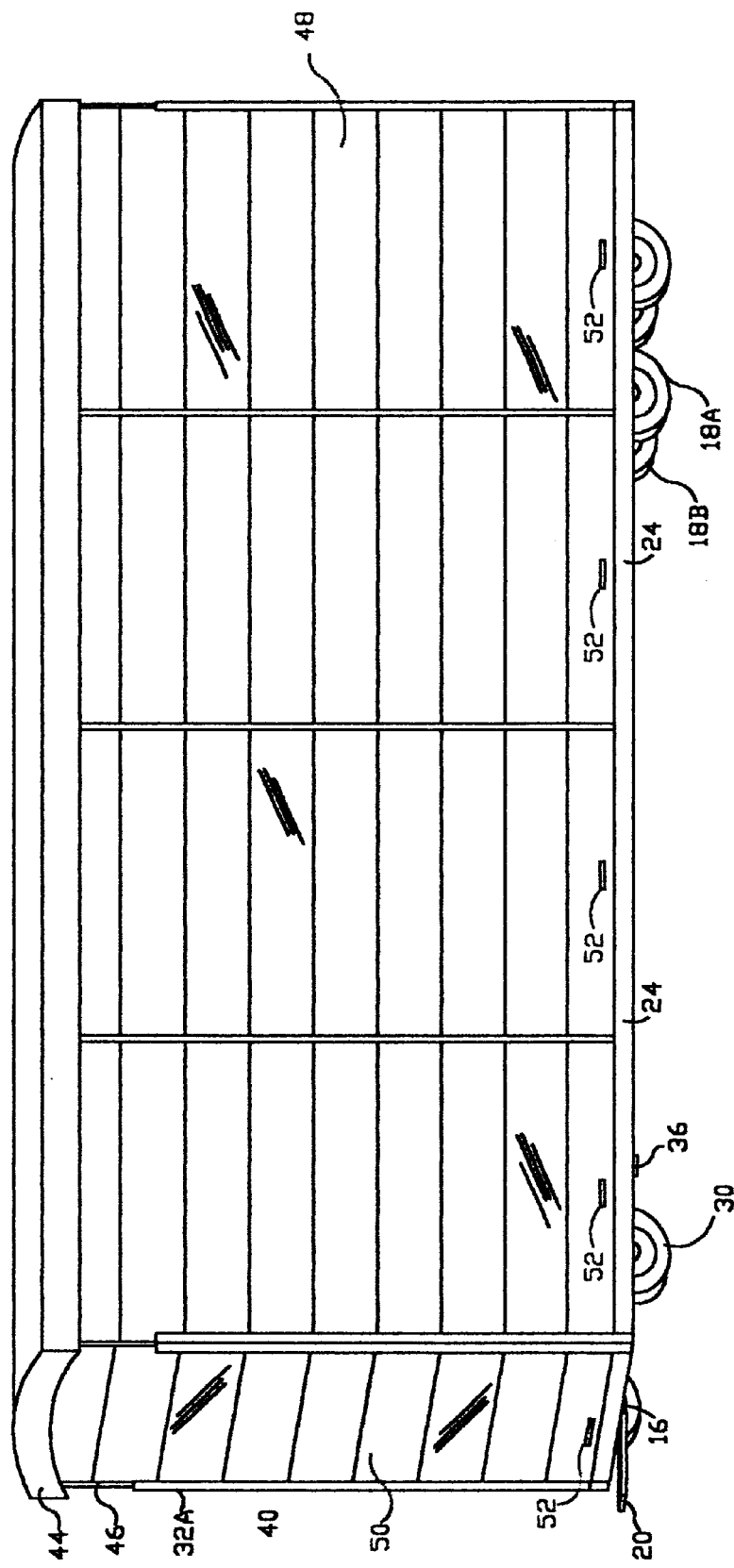
FIG. 7 is a view of the mobile stage showing the panels for enclosing the side and ends of the stage in a closed position.

FIG. 7 shows the panels 50 for covering the sides and ends of the stage 10. Each panel 50 has a handle 52 for lifting the panel from its closed position to its open position.

Figure 7A:
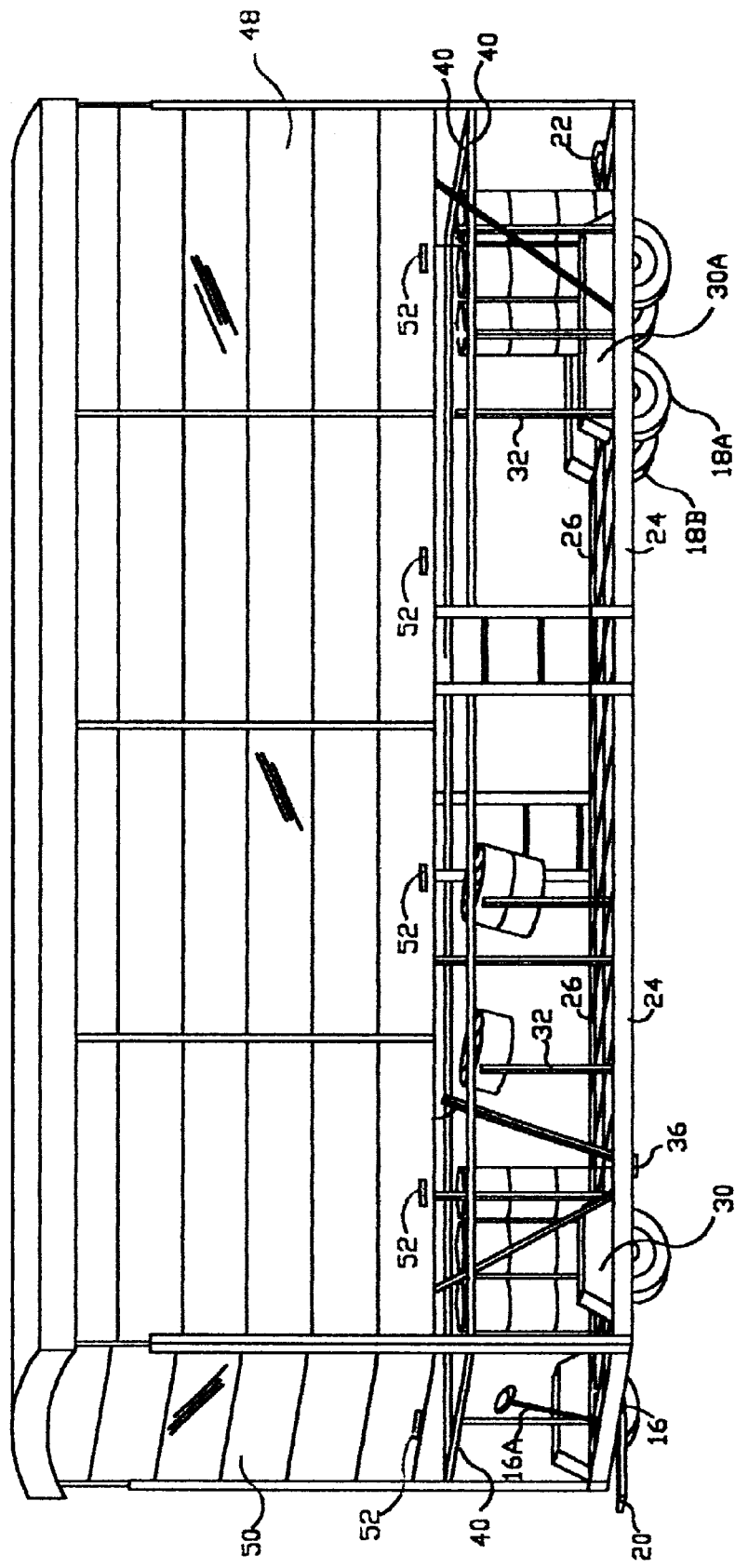
FIG. 7A is a view of the mobile stage showing the side and end wall panels their partially retracted position.

FIG. 7A shows the panels 50 for covering the sides and ends of the stage 10 in partially retractable position. When completely retracted, the entire stage 10 and all the instrumentalists and their instruments are visible to the viewing audience.

In the primary embodiment of the invention, there is no means of enclosing the sides, front and rear sections of either the lower and upper decks, which remain uncovered during and after the vehicle is used. However, in another embodiment of the invention; the front, rear and sides of the stage may be enclosed by for the purpose of storing and protecting the instruments from theft, vandalism or other damage when the vehicle and the instruments are not being used. The method of enclosing the vehicle may include material used as covering for the canopy roof such as lightweight waterproof material such as plastic, canvas, tarpaulin or other known semi-permanent or permanent waterproof covering material. However, the sides, front and real panels may also be fitted with removable plastic wall units which can be removed before performances and replaced afterwards, these type of wall units may also include storage facilities for the convenience of the instrumentalists. The use of the removable wall units converts the invention to a secure storage unit and mobile stage facility which protect the instruments from theft or damage by vandals.

Another means for enclosing the sides, front and rear of the stage is through the use of retractable panels which can be stores in the roof of the stage within the area encompassed by the canopy roof.

As originally conceived, the mobile stage 10, was designed to be used exclusively as a means of transporting steel band musicians and their instruments in relative safety in carnivals and street parades in which the band is used as an accompaniment for the participants. However, the mobile stage of the invention will find use in any situation in which any type of musicians or artistes are called upon to perform in an environment in which the musician or artistes are expected to continue their performance on a moving stage or platform.

Other improvements and additions have made the mobile stage of this invention adaptable for use as a storage unit by attaching retractable or removable front, rear and side walls to the upper and lower decks of the stage. In addition, the stage may be used in general transportation of people a, equipment or products if it becomes necessary to do so. Accordingly, the stage is useable in a variety of situations not specifically identified or mentioned in the description hereof.

We claim:

1. A mobile double decked performance stage for transportation of steelband instrumentalists and their instruments consisting of a base chassis resting on ground engaging wheels which chassis supports rectangular lower and upper deck platforms disposed one above the other and having as coverage for said upper deck a canopy roof situated above said upper deck and wherein said lower and upper deck platforms each have a meshed floor thereon;

said base chassis including said lower deck, front and rear ground engaging wheels, front and rear wheel axles, a steering mechanism, tow bar and hitch means for attachment of one performance stage to another and for attachment of said performance stage to a means of transportation;

said lower deck consisting of a substantially flat rectangular frame having lengthwise and crosswise support beams affixed to said rectangular frame, vertical posts attached to said rectangular frame of said lower deck providing support means upon to which said upper deck rests, said upper deck consisting of a rectangular frame identical in size, shape and construction as said rectangular frame of said lower deck, including said support beams, said upper deck being supported and held in parallel alignment with and at a fixed distance above said lower deck by said vertical posts on said lower deck and having vertical posts attached to said rectangular frame of said upper deck, a canopy roof disposed above and supported by said vertical posts attached to said rectangular frame of said upper deck and roof support means attached to said vertical support posts providing support for said covering of said roof canopy and ladder means connecting said upper and lower deck.

2. A mobile double decked performance stage as claimed in claim 1 wherein the surface area encompassed by said rectangular frame of said lower and upper decks is covered by a sturdy weight bearing corrugated mesh material for providing unobstructed visual and acoustical contact between said upper deck and said lower deck and wherein said mesh material covering the surface of said rectangular frame of said upper and lower decks is supported lengthwise and crosswise by said support means of said upper and lower decks.

3. A mobile double decked performance stage as claimed in claim 1 wherein the preferred material for use in construction of said stage, including said support beams within said rectangular frame of said upper and lower decks, said rectangular frame, said vertical support posts and said meshed floor are iron or steel and capable of bearing the weight of a full complement of steelband instrumentalists and their instruments and wherein the combined weight of a full complement of steelband instrumentalists and their instruments is approximately 4,000 pounds.

4. The mobile performance stage as claimed in claim 1 wherein said meshed floor is capable of bearing the weight of the steelband instrumentalists and their instruments thereupon whether said performance stage is being used in a mobile or stationary mode.

5. The mobile performance stage as claimed in claim 1 wherein said roof covering material for said canopy roof may be selected from light weight materials such as plastic, canvas, tarpaulin or other waterproofed material.

6. The mobile performance stage as claimed in claim 1 wherein said lower chassis includes a front set of ground engaging wheels and a rear set of ground engaging wheels and wherein said front set of ground engaging wheels operates independently of said rear set of engaging wheels and wherein said front set of ground engaging wheels are attached to a steering guidance mechanism so that said performance platform is capable of turning independently of the means of transportation being used to propel said stage and wherein each set of ground engaging wheels consists of at least two but not more than four ground engaging wheels and wherein said transportation device is a truck, automobile any other vehicle suitable for serving as ground transportation means for said performance stage.

7. The mobile performance stage as claimed in claim 1 wherein said lower deck includes a manually operated hydraulic brake mechanism mounted on said deck, brake pads attached to said front engaging wheels for bringing said stage to a stop independently of said transportation device to which said stage is attached.

8. The mobile performance stage as claimed in claim 1 wherein the axle of said front set of ground engaging wheel is narrower than the axle of said rear set of ground engaging wheels and wherein said rear set of engaging wheels may consist of two sets of independently operated wheels and wheel axles.

9. The mobile performance stage as claimed in claim 8 wherein said rear set of ground engaging wheels consists of one or two sets of independently operated wheels and wheel axles consisting of a minimum of two and a maximum of eight ground engaging wheels.

10. The mobile performance stage as claimed in claim 1 wherein said front set of ground engaging wheels and said steering mechanism include a tow bar for attaching said performance stage to a means of transportation to facilitate the turning of said performance stage independently of said means of transportation.

11. A mobile double decked performance stage, storage device and transportation means for steelband instrumentalists and their instruments consisting of a base chassis resting on ground engaging wheels which chassis supports rectangular lower and upper deck platforms disposed one above the other and having a frame for supporting a canopy roof resting on said upper deck;

said base chassis including said lower deck, front and rear ground engaging wheels, front and rear wheel axles, a steering mechanism and tow bar for attachment of said performance stage to transportation means, said lower deck consisting of a substantially flat rectangular frame having longitudinal and lateral crossbar support means within said rectangular frame and vertical posts attached to said rectangular frame of said lower deck for providing support means for attachment of said lower deck to said upper deck, said upper deck consisting of a rectangular frame identical in size, shape and construction as said rectangular frame of said lower deck, said upper deck being supported and held in parallel alignment with and at a fixed distance from said lower deck by said vertical posts on said lower deck and having vertical posts attached to said rectangular frame of said upper deck, a canopy, roof disposed above and supported by Kid vertical posts attached to said rectangular frame of said upper deck ladder means, front, rear and side wall panels for enclosing and securing said instruments on said stage against theft, vandalism, exposure to the elements or other damage.

12. The mobile performance stage and storage device as claimed in claim 11 wherein said wall panels are made of plastic or other light weight materials and wherein said wall panels include built-in storage compartments for storing musical instruments, artifacts, personal items used by the instrumentalists.

13. The mobile performance stage as claimed in claim 11 wherein said wall panels are light weight, portable and detachable from said stage during performances.

14. The mobile performance stage as claimed in claim 11 wherein said front, rear and side wall panels are a plastic and may be stored on or within said canopy roof during performances.

15. The mobile performance stage as claimed in claim 11 wherein said front, rear and side wall panels are retractable for storage in said canopy roof during use of the performance stage.

16. The mobile performance stage as claimed in claim 1 wherein said lower chassis and said upper chassis are approximately 26 feet long by 10 feet 3 ins. wide and wherein the combined height of the upper and lower decks does not exceed 15 feet.

* * * * *